United States Patent [19]

Piesold

[11] 4,344,720
[45] Aug. 17, 1982

[54] DECANTS OF TAILINGS DAMS

[76] Inventor: David D. A. Piesold, Warwick House, 25 Buckingham Palace Rd., London SW1W 0PP, England

[21] Appl. No.: 160,893

[22] Filed: Jun. 19, 1980

[30] Foreign Application Priority Data

Jul. 4, 1979 [GB] United Kingdom ................ 7923211

[51] Int. Cl.$^3$ ............................................. E02B 11/00
[52] U.S. Cl. .................................... 405/41; 285/419; 285/425; 285/DIG. 14
[58] Field of Search ............... 138/118, DIG. 11, 178; 285/419, 367 (U.S. only), DIG. 14, 411, 425, 61; 405/41, 50

[56] References Cited

U.S. PATENT DOCUMENTS

| 1,087,163 | 2/1914 | Giesenhaus | 405/41 X |
|---|---|---|---|
| 1,854,855 | 4/1932 | Nakashima | 285/367 X |
| 2,068,876 | 1/1937 | Snyder, Jr. | 285/223 |
| 2,195,492 | 4/1940 | McDonald | 285/DIG. 14 X |
| 3,021,871 | 2/1962 | Rodgers | 138/178 X |
| 3,037,356 | 6/1962 | Alcoriza | 405/41 |
| 3,288,169 | 11/1966 | Moss | 138/118 |
| 3,402,743 | 9/1968 | Brueder | 138/178 |
| 3,623,753 | 11/1971 | Henry | 285/DIG. 14 X |
| 3,632,140 | 1/1972 | Paine | 138/178 X |
| 3,765,707 | 10/1973 | Wesberg | 285/419 X |
| 3,822,075 | 7/1974 | Duncan | 285/367 |
| 4,009,734 | 3/1977 | Sullivan | 138/118 X |
| 4,218,812 | 8/1980 | Jonsson | 285/223 X |

FOREIGN PATENT DOCUMENTS 1294293 4/1969 Fed. Rep. of Germany ........ 405/41

Primary Examiner—Thomas F. Callaghan
Attorney, Agent, or Firm—Sughrue, Mion, Zinn, Macpeak & Seas

[57] ABSTRACT

The decant 2 of a tailings dam comprises a pipe which is formed as a coil with turns 4 which are axially spaced apart one above the other. The end of the bottom turn is connected to a laterally extending water outlet pipe 6 which leads out of the tailings dam and the end of the top turn 7 is open and forms an inlet for the flow of water through the decant out of the dam. The coil is preferably in the form of a conical spiral and the turns are of such a size in relation to the cross-sectional area and wall thickness of the pipe from which they are formed that the coil is compressed axially without overstressing the pipe as, in continued use of the dam, tailings are consolidated around the decant and the decant is gradually extended upwards turn after turn.

8 Claims, 6 Drawing Figures

DECANTS OF TAILINGS DAMS

BACKGROUND OF THE INVENTION

The tailings which result from flotation or other wet techniques for separating minerals from their ores are in the form of a slurry of the tailings in water. To dispose of these tailings, the slurry is commonly pumped to a tailings dam. Tailings dams are reservoirs where the tailings settle out from the water onto the bed of the reservoir and the water is conducted away from the reservoir and is either recirculated to the separation plant or is disposed of.

To ensure that the water leaving the dam contains a minimum of tailings, the flow of water from a dam takes place from its surface through a decant which comprises a pipe which has an open upper end and extends downwards through the slurry and through any tailings already deposited in the dam to a further pipe which extends laterally under a wall or other barrier which holds the slurry in the dam.

Decants commonly consist of a straight vertical pipe which is gradually extended upwards over a long period of time as the dam fills with deposited tailings and accordingly the water level in the dam gradually rises.

It has been found that such decants quite frequently fail in compression over a period of years and, if this happens, it is necessary to plug the decant and to install a new decant through the slurry and downwards through the deposited tailings and usually to install a new laterally extending pipe as well. The expense of doing this is very great.

The failure of the decants in compression occurs because the tailings build up around and are pressed against the outside surface of the decant and the tailings are of such a nature that they exert a very substantial frictional grip on the decant. As the tailings at the bottom of the dam are consolidated by the deposition of more tailings on top of them, a downward frictional force is applied to the decant and this, in the course of time, becomes so large that the decant is stressed axially to such an extent that it is crushed. The pipe of the decant commonly has a supporting structure such as a surrounding reinforced concrete casing, but even so failure still occurs.

Attempts have been made to overcome this problem by providing the decant with flanged joints fitted with axially compressible rubber sealing rings. As the tailings move downwards as they consolidate, the pipe is also able to move downwards by compression of the sealing rings. However the downward movement of the pipe is progressive, being a minimum at the top of the deposited tailings and a maximum at the bottom of the decant where the decant joins the laterally extending pipe. The movement towards the bottom of the decant tends to be so great that the rubber sealing rings are overstressed and are broken. The deposited tailings are permeable to water and accordingly water leaks into the decant through the joint where the sealing ring is damaged and carries tailings into the decant with it. This means that the water discharged from the decant is severely polluted and, because it is impossible to replace the sealing ring which is far below the surface of the deposited tailings, it is again necessary to plug the decant and construct a new one.

The aim of the present invention is to overcome the problem of destruction of the decants of tailings dams and to this end, according to this invention, the decant of a tailings dam comprises a pipe which is formed as a coil with axially spaced turns one above the other, the end of the bottom turn being connected to a laterally extending water outlet pipe or other duct and the end of the top turn being open for the flow into it of water from the dam, and the turns being of such a size in relation to the cross-sectional area and wall thickness of the pipe from which they are formed that the coil is compressed axially, as, in use of the dam, tailings are consolidated around the decant, without overstressing the pipe.

Thus the decant in effect forms a coiled compression spring which is compressed by the consolidation of the tailings as the tailings build up on the bed of the dam around the decant and the compression takes place within the elastic limits of the pipe from which the spring is formed. It is possible in this way to absorb very large downward movements of the tailings as they consolidate without causing any damage to the decant.

The turns of the coil may be of any shape which is consistent with their being able to move towards each other without overstressing the pipe and the pipe may also be of any cross-sectional shape with the same proviso. Preferably, however, the pipe is of circular cross-section and the turns of the coil to which the pipe is formed are also preferably circular.

The coil may be a helix except for its bottom turn which preferably lies in a plane perpendicular to the axis of the coil so that it can rest on a horizontal bed to support the turns of the coil above it.

However, as the tailings gradually build up from the bottom of the dam around the decant, and additional lengths of pipe forming additional turns are added to extend the decant upwards, the downward movement of the lower turns of the coil will be greater than the downward movement of the turns nearer the top of the coil. If the coil is helical, the turns must be of sufficiently large diameter to absorb a maximum movement at the bottom of the coil and this means that the higher coils are of a larger diameter than is necessary to absorb the movement to which they are subjected. Accordingly the decant pipe as a whole is longer than is necessary and this increases the cost and also increases the frictional head loss of the water flowing through it. Preferably therefore the pipe is formed into an upwardly tapering conical spiral so that each successive turn of the coil is of a smaller diameter than the turn immediately below it. In this way it is possible to make each turn of the coil of a diameter which is just sufficient to enable the pipe in the turn to withstand the downward deflection of the turn relative to the turn below it.

The axial spacing between adjacent turns of the coil may be small or larger in dependence upon the particular stress conditions which are anticipated. These will depend again upon the diameter or thickness of the pipe and upon the nature of the tailings which will affect the amount by which they are consolidated as the tailings build up.

The major strain in a decant pipe formed into a coil in accordance with the invention is torsional and in general this is much greater than the strain due to bending or shear.

As the tailings are consolidated around the pipe, the pipe, if initially of circular cross-section, may become slightly oval with its major axis horizontal, but the passive resistance of the tailings surrounding the sides of the pipe would be very great and would tend to resist any such distortion of the cross-section of the pipe.

The wall thickness of the pipe should be made as thin as is consistent with the stresses to which it is subjected, bearing in mind also the consideration that the pipe is subjected to some wear from any tailings remaining in the water discharged from the dam through the decant.

The coil is built up from individual sections or lengths of piping as the level of the tailings dam rises as has already been mentioned and, since tailings dams are generally in situations where skilled labour is scarce or non-existent and the conditions are unsuitable for high quality welding, the joints between adjacent sections of the piping are preferably mechanical.

The use of heavy flanged joints may introduce large secondary stresses in the pipe since the bending of the pipe will be inhibited by the flanges and accordingly if flange joints are used, these should preferably be made as thin as as practicable with thin sealing gaskets or sealing by means of paste sandwiched between the flanges. The use of a large number of small bolts around each flange is preferable to the use of a smaller number of larger bolts.

In cases where the large torsional strains are expected, it is preferable to avoid the use of flanged joints and instead the joints between adjacent sections of piping preferably comprise a locking ring which surrounds and is welded to the end of each pipe section. Each locking ring has a series of circumferentially spaced and axially projecting teeth which mesh with the teeth of the locking ring at the end of the adjacent pipe section. The meshing of the teeth transmits torsional stresses in one section of piping to the adjacent section of piping. The sections of piping are held together by straps which surround the two meshing locking rings and have radially inwardly directed side edges which engage over the edges of the locking ring remote from the teeth and so prevent the locking rings, and hence the pipe sections, from moving axially away from each other. Each of the straps is formed in two semi-circular sections which are fitted around the locking rings and are then bolted to each other to form a continuous circular strap surrounding the locking ring at each joint. The teeth on the locking rings may be of a rectangular wave form, but they are preferably shaped so that the flanks of the teeth taper slightly towards the free ends of the teeth and similarly spaces between adjacent teeth taper towards the roots of the teeth. This tapering arrangement makes it easier to bring the teeth of the two locking rings at a joint into mesh with each other.

The coiled pipe forming the decant may be free-standing on the bed of the tailings dam so at no time the pipe extends very far above the surface of the tailings deposited in the dam. As the length of the coil is increased by the addition of further turns, more of the turns at the bottom of the coil become supported by the deposited tailings. Even if the axis of the coil does deflect slightly from the vertical in a very high dam, which may, for example, be up to 100 m high, the stresses arising from the deflection are not likely to be very significant. Nevertheless under some circumstances the decant may include some additional structure for supporting the coil provided of course that this structure does not inhibit the compression of the coil. Generally speaking all that is necessary is some temporary support of the turn or turns of the coil which project in the slurry above the surface of the consolidated tailings in the dam up to the water level. This temporary structure is dismantled and replaced from time to time as further turns are added to the coil and the level of the consolidated tailings rises.

BRIEF DESCRIPTION OF THE DRAWINGS

An example of a decant in a tailings dam in accordance with the invention is illustrated in the accompanying drawings, in which:

As shown in FIG. 1, a tailings dam has a bed 1 upon which a decant 2 is supported. As has already been explained, and is in any case well known, the decant 2 starts with only a small height and is extended upwards in stages as the tailings dam gradually fills over a period of time with tailings and the fill level rises to the positions shown at 1' and eventually to that shown at 1". The water level in the tailings dam starts only a little above the bed 1, and then subsequently remains a little above the fill level as shown at 3' and 3". The water level 3" is the final water level when, after a period of years, the tailings dam is almost filled with tailings.

Figure 1:
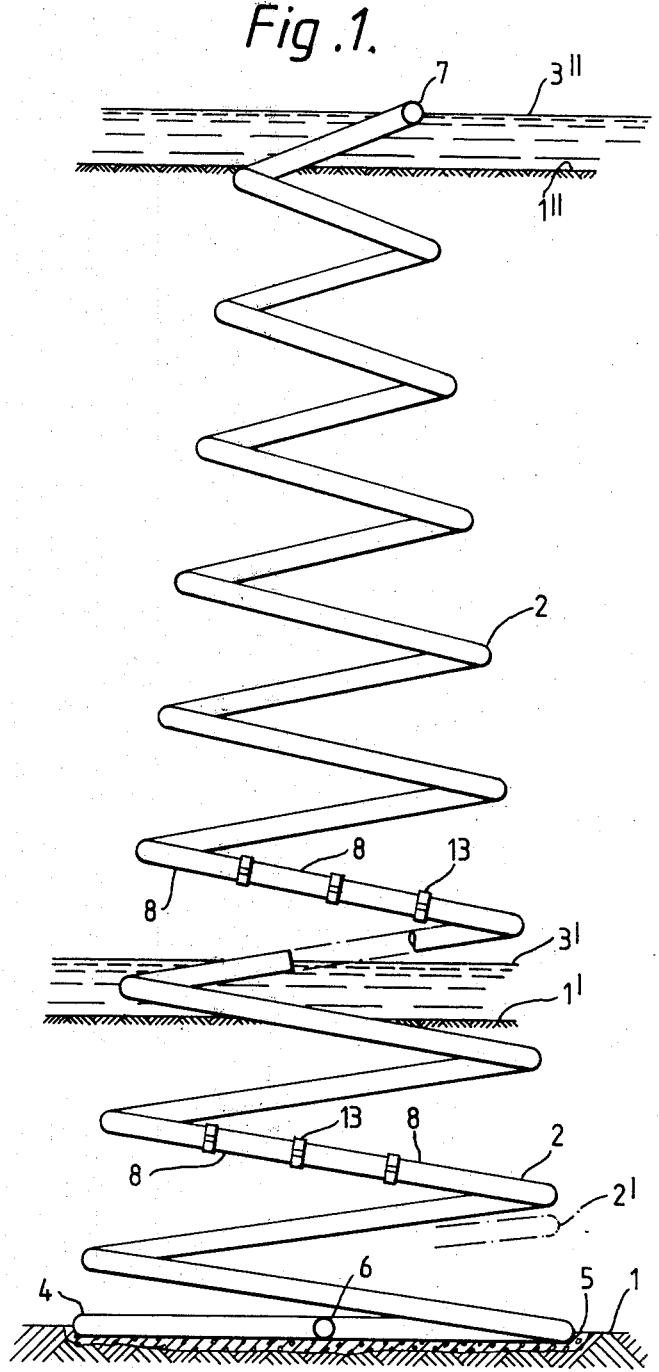
FIG. 1 is a side view, partly in section, of the decant.

The decant 2 consists of a steel pipe of circular cross section which is formed into an upwardly tapering conical spiral. A bottom turn 4 of the decant is however wound in a horizontal plane to support the decant on concrete bedding 5 placed on the dam bed 1. The end of the bottom turn 4 of the decant leads to a laterally extending drain pipe 6 which leads out of the tailings dam to an open drain for draining away the water in which the tailings are discharged into the dam. The beginning of the pipe 6 is indicated in FIG. 2 of the drawings.

Figure 2:
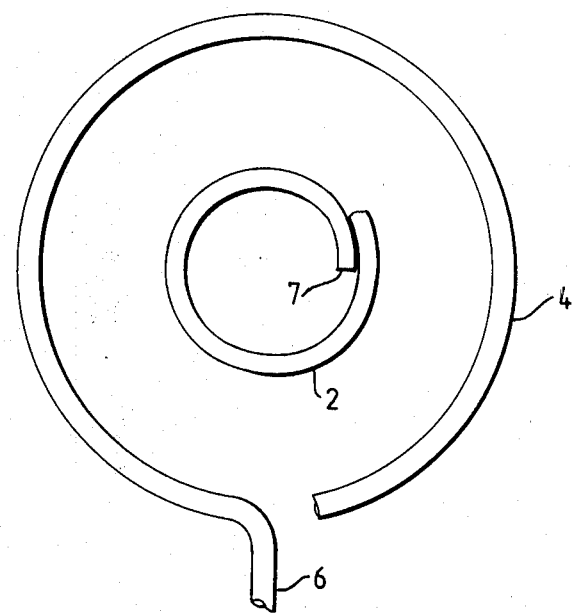
FIG. 2 is a plan view of the decant showing only the top and bottom turns of the coil.

As has already been mentioned, the decant is extended as the fill level rises and the upper end of the decant, which is shown in FIGS. 1 and 2 at 7 when the water level reaches its maximum level, is open and forms an entry for the water from the tailings dam as the tailings settle out of the water.

As already explained in general terms, the lower turns of the conical spiral decant 2 move downwards so that the spiral is compressed axially as the fill level rises and the fill below, which closely surrounds the turns of the decant is consolidated and moves downwards. The movement downwards of the one but lower most turn of the decant 2 is indicated in FIG. 1 at 2'.

In this particular example, the decant has a maximum diameter of eighteen meters and it is formed from steel pipe having an internal diameter of 610 mm and a wall thickness of 20 mm. The estimated maximum downward deflection of the one but lower most turn of the decant is approximately 1 meter when the tailings dam has been filled to its maximum level with tailings.

Figure 3:
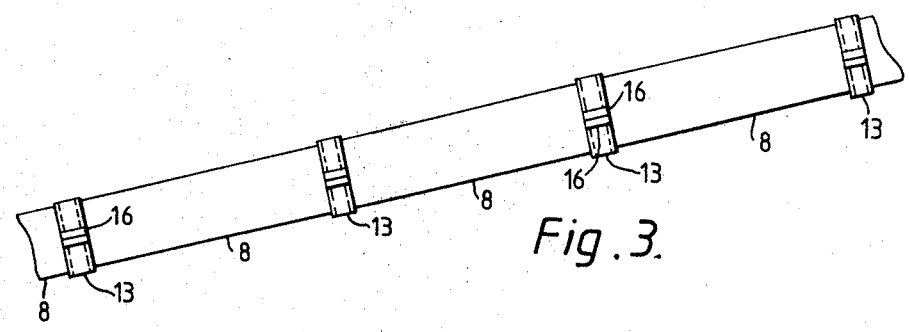
FIG. 3 is a side view of a part of the pipe forming the coil showing joints between adjacent sections of piping.

As shown in FIG. 3, the decant 2 is formed from a series of sections 8 of pipe so that the decant can be extended upwards section by section as the tailings and water level rise. The upper end of each section in turn thus forms the entry to the decant.

Figure 6:
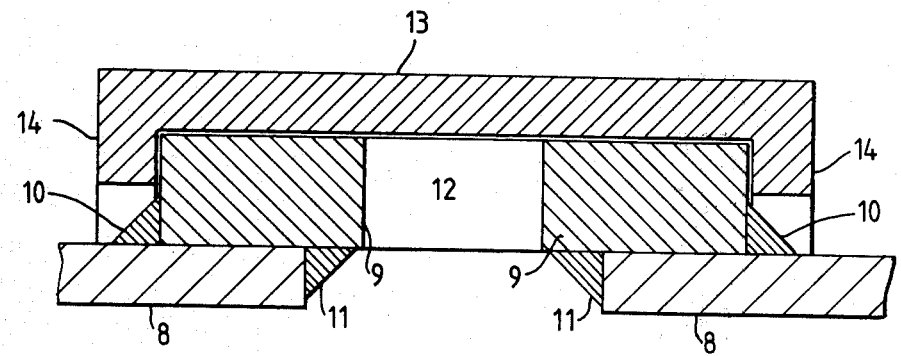
FIG. 6 is a radial section to a still larger scale through one of the joints.
Figure 4:
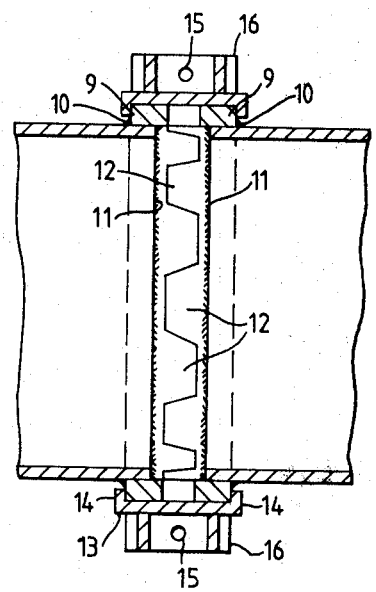
FIG. 4 is a diametric section to a larger scale through one of the joints shown in FIG. 3.
Figure 5:
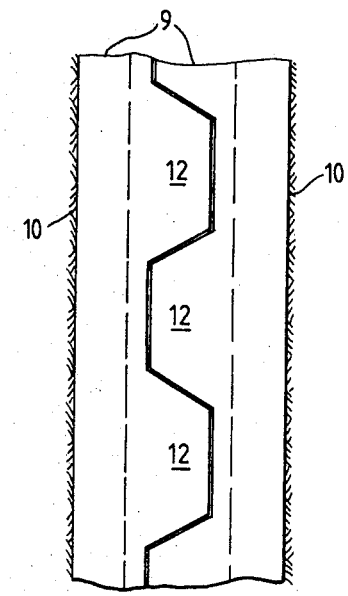
FIG. 5 is a developed radial view of meshing teeth of the locking rings of the joint shown in FIG. 4 to a still larger scale.

The sections 8 are connected to each other by mechanical joints which are shown in detail in FIGS. 4 to 6 of the drawings.

Each pipe section 8 has a locking ring 9 welded to each of its ends by means of external and internal fillet welds 10 and 11 respectively. Each of the locking rings 9 is formed with a series of axially projecting teeth 12. The teeth 12 have their flanks tapering from the roots towards the tips or free ends of the teeth so that the gaps between the teeth taper from the free ends of the teeth towards the roots of the teeth. All the teeth of all of the locking rings are of the same size as each other and the gaps between the teeth are slightly larger than the teeth themselves so that the teeth of one locking ring at each joint mesh with the teeth of the other locking ring at the joint and the taper of the teeth facilitates the bringing of the teeth into mesh with each other as each new pipe section 8 is fitted.

Once the teeth of the locking ring at the lower end of each pipe section are meshed with the teeth of the locking ring at the upper end of the preceding section, the joint between the two sections is completed by placing a strap 13 around the locking rings. Each of the straps 13 is formed in two semi-circular halves which are of channel-shaped section with radially inwardly directed sides 14. The sides 14 fit closely over the locking rings 9 and when the two halves of each strap 13 have been fitted in position, the halves are fixed to each other to form a complete strap by bolts which are inserted in holes 15 in flanges 16 on the ends of the strap halves.

To ensure that each of the joints between the pipe sections 8 is tightly sealed, a sealant paste is applied to the insides of the strap halves before they are placed in position so that this sealant paste is squeezed between the insides of the straps 13 and the locking rings 9 as shown in FIG. 6.

While in this example the decant pipe is of steel and this is the material which is most commonly used, in some circumstances the tailings can be corrosive to steel. It may then be necessary to use pipes made of aluminum or other metals or alloys, or in some cases pipes of reinforced concrete or plastics material may be used.

I claim:

1. A decant for a tailings dam, comprising:
a heavy duty coiled pipe having a bottom and a top, said pipe having a water inlet at an upper end thereof;
a water outlet duct extending laterally from said bottom of said coiled pipe out of said dam, said coiled pipe comprising a plurality of turns axially spaced apart one above the other, said turns being large and so sized in relation to the cross-section area and wall thickness of said pipe from which said turns are formed that, in use of said dam, said coil is compressed axially as tailings deposited in said dam are consolidated around said decant without said pipe being overstressed by said axial compression.

2. The decant as claimed in claim 1, in which said pipe is of circular cross-section and said turns are also circular.

3. A decant as claimed in claim 2, in which said coiled pipe is formed into an upwardly tapering conical spiral, whereby each successive turn of said coil is of a smaller diameter than the turn of said coil immediately below it.

4. A decant as claimed in claim 1, in which said coiled pipe comprises a plurality of individual sections of piping and means rigidly joining said individual sections to each other to form said coil, whereby said coiled pipe can be increased in length as the level of said tailings dam rises.

5. The decant as claimed in claim 4, in which said means rigidly joining said individual sections together each comprises a locking ring surrounding and welded to each pipe section, a series of circumferentially spaced and axially projecting teeth projecting from said locking ring, said teeth meshing with similar teeth of the locking ring at the end of an adjacent pipe section, and strap means which surrounds said locking rings having said meshing teeth, said strap including inwardly directed edge portions engaging over edges of said locking rings remote from said teeth to prevent said locking rings and hence said sections from moving axially away from each other.

6. The decant as claimed in claim 5, in which each of said straps comprises two semi-circular sections fitting around said locking rings and bolt means joining said semi-circular sections to each other to form a continuous circular strap surrounding said locking rings.

7. The decant as claimed in claim 5, in which said teeth include flanks which taper towards each other towards free ends of said teeth and spaces between said teeth taper towards roots of said teeth.

8. The decant as claimed in claim 1, further comprising means free-standingly supporting said decant on a bed of said dam.

* * * * *